United States Patent
Schmidt et al.

(10) Patent No.: US 8,458,743 B2
(45) Date of Patent: Jun. 4, 2013

(54) METHOD AND A SYSTEM FOR DISTRIBUTING TV CONTENT OVER A NETWORK

(75) Inventors: Mischa Schmidt, Buerstadt (DE); Oleg Neuwirt, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 336 days.

(21) Appl. No.: 12/934,128

(22) PCT Filed: Sep. 22, 2009

(86) PCT No.: PCT/EP2009/006831
§ 371 (c)(1),
(2), (4) Date: Sep. 23, 2010

(87) PCT Pub. No.: WO2010/034459
PCT Pub. Date: Apr. 1, 2010

(65) Prior Publication Data
US 2011/0030003 A1    Feb. 3, 2011

(30) Foreign Application Priority Data
Sep. 24, 2008 (EP) .................................... 08016755

(51) Int. Cl.
H04N 7/10      (2006.01)
H04N 7/025     (2006.01)
(52) U.S. Cl.
USPC ................... 725/34; 725/32; 725/35; 725/36
(58) Field of Classification Search
USPC .............................................. 725/32, 34–36
See application file for complete search history.

(56) References Cited

U.S. PATENT DOCUMENTS

| | | |
|---|---|---|
| 6,615,039 B1 | 9/2003 | Eldering |
| 8,060,904 B1 * | 11/2011 | Evans et al. ..................... 725/35 |
| 2002/0107940 A1 | 8/2002 | Brassil |
| 2008/0127250 A1 | 5/2008 | DaCosta |

FOREIGN PATENT DOCUMENTS

WO        00/79734 A1    12/2000

OTHER PUBLICATIONS

International Search Report, dated Feb. 10, 2010, from corresponding PCT application.
Jack Brassil et al., "Program Insertion in Real-Time IP Multicasts", Computer Communication Review, Apr. 1, 1999, pp. 49-68, vol. 29, No. 2, XP-000829009; Cited in International Search Report.

* cited by examiner

*Primary Examiner* — Hunter B Lonsberry
(74) *Attorney, Agent, or Firm* — Young & Thompson

(57) ABSTRACT

For allowing large numbers of users to receive targeted TV advertisements during advertisement breaks without requiring unicast content transmission a method is provided for distributing TV content over a network, especially an IP network, wherein the TV content includes a main content and an advertisement content and wherein a multicast address on which a TV channel for the main content is distributed within the network is transmitted to a user as a connectivity information. The method includes the step of transmitting further connectivity information to the user, the further connectivity information depending on at least one advertising segment of the advertisement content which the user is requesting or which the user is assigned to. Further, a system for distributing TV content over a network, preferably for carrying out the above mentioned method is also described.

12 Claims, 2 Drawing Sheets

METHOD AND A SYSTEM FOR DISTRIBUTING TV CONTENT OVER A NETWORK

BACKGROUND OF THE INVENTION

1. Field of the Invention

The present invention relates to a method and a system for distributing TV content over a network, especially an IP network, wherein the TV content is comprising a main content and an advertisement content and wherein a multicast address on which a TV channel for the main content is distributed within the network is transmitted to an user as a connectivity information.

2. Description Of The Related Art

Distribution of TV (Television) content over for example IP (Internet Protocol) networks usually involves IP multicasting in order to save bandwidth consumption compared to IP unicasting. Before an IPTV set (e.g. IPTV Set Top Box) can "tune-in" into a TV channel on the IP network it first needs to learn the IP multicast address on which the TV channel is broadcasted or distributed in the operator's network.

The ultimate problem when trying to deliver targeted content in IP networks is the bandwidth consumption caused by unicast point-to-point traffic. Although this might be feasible for traditional internet usage such as web browsing and email it causes serious problems in IPTV systems. The key difference is that an IPTV system has partially hard realtime requirements to the network and requires a sufficient sustained bandwidth for the AV (Audio-Video) content delivery. In order to be able to deliver IPTV channels to large numbers of users IP multicasting must be used to keep the bandwidth consumption at an acceptable limit for the operator's core network. Multicasting IPTV content for broadcasting TV channels works fine because all the users that are watching the same IPTV channel are supposed to see the same content. However, this does not apply in targeted advertisement scenarios, where users that are watching the same IPTV channel are supposed to see different advertisement content or advertisement segments at the same time. Although switching from IP multicasting to IP unicasting during advertisement breaks would enable delivery of targeted advertisement content or advertisement segments to individual users, it would also exceed the IPTV networks bandwidth capacities.

SUMMARY OF THE INVENTION

Within the present invention an advertisement segment is a subdivision of an advertisement content that could be mainly targeted at one or more specific users or groups of users.

It is an object of the present invention to improve and further develop a method and a system for distributing TV content over a network for allowing large numbers of users to receive targeted TV advertisements without requiring unicast content transmission.

In accordance with the invention, the aforementioned object is accomplished by a method characterized by the step of transmitting further connectivity information to the user, the further connectivity information depending on at least one advertising segment of the advertisement content which the user is requesting or which the user is assigned to. The system is characterized by means for transmitting further connectivity information to the user, the further connectivity information depending on at least one advertising segment of the advertisement content which the user is requesting or which the user is assigned to.

In accordance with the invention, the aforementioned object is accomplished by a method comprising the features of claim 1 and a system comprising the features of claim 11. According to claim 1 the method is characterized by the step of transmitting further connectivity information to the user, the further connectivity information depending on at least one advertising segment of the advertisement content which the user is requesting or which the user is assigned to. According to claim 11 the system is characterized by means for transmitting further connectivity information to the user, the further connectivity information depending on at least one advertising segment of the advertisement content which the user is requesting or which the user is assigned to.

According to the invention it has been recognized that it is possible to allow large numbers of users to receive targeted TV advertisements by the step of transmitting further connectivity information to the user. Such further connectivity information is depending on at least one advertising segment which the user is requesting or which the user is assigned to. In other words, the user will receive specific connectivity information for allowing him to receive the requested or selected advertising segment of the advertisement content. Particularly, the further connectivity information will allow large numbers of users to receive targeted TV advertisements without requiring unicast content transmission.

This increases the effectiveness of advertising and at the same time keeps the bandwidth consumption on the network at an acceptable rate.

Preferably, the further connectivity information is comprising a further multicast address on which the advertising segment is distributed. Thus, the user will be able to receive the main content and the advertisement content on the basis of multicasting from two different multicast groups, one for the main content and one for the advertisement content. Such a method or system is working on the basis of ASM (Any Source Multicast).

Alternatively, the further connectivity information is comprising a source address for the main content and a source address for the advertising segment. In this case the user will receive the main content and the advertisement content via only one multicast group according to the multicast address. The differentiation with regard to the main content and the advertisement content is realised by different source addresses for the main content and the advertisement content. This method and system can operate on the basis of standard SSM (Source Specific Multicast) mechanisms, while network resources are saved.

With regard to a best possible effectiveness and saving of bandwidth consumption all streaming servers which are distributing the main content and the advertisement content are synchronized, so that only the main content or the advertisement content is received at the user at a given point in time or time period. In other words, the user will receive in this case only the main content or the advertisement content at a given point in time or time period. Parallel distribution will be avoided.

Within a preferred embodiment of the invention the given point in time or time period is an advertisement break. Thus, the advertisement content will only be transmitted during an advertisement break on the TV channel for the main content.

With regard to a very simple method and system according to the invention the connectivity information and/or further connectivity information could be provided by an EPG (Electronic Program Guide) server. Such an EPG server could provide IPTV channel connection details to the user or a receiving IPTV set.

Alternatively the connectivity information and/or further connectivity information is carried in a session setup signaling. Such a session setup signaling could be provided by SIP (Session Initiating Protocol) signaling in case of IMS (IP Multimedia Subsystem) based IPTV.

Alternatively the connectivity information and/or further connectivity information could be provided by preconfiguration or manual configuration. Such a preconfiguration could be provided by preferably overnight download of the connectivity information and further connectivity information. Such a download could comprise all connectivity information and further connectivity information.

There are several ways how to design and further develop the teaching of the present invention in an advantageous way. To this end, it is to be referred to the following explanation of preferred examples of embodiments of the invention, illustrated by the drawing on the other hand. In connection with the explanation of preferred embodiments of the invention by the aid of the drawing, generally preferred embodiments and further developments of the teaching will be explained.

BRIEF DESCRIPTION OF THE DRAWING FIGURES

DETAILED DESCRIPTION OF THE INVENTION

Figure 1:
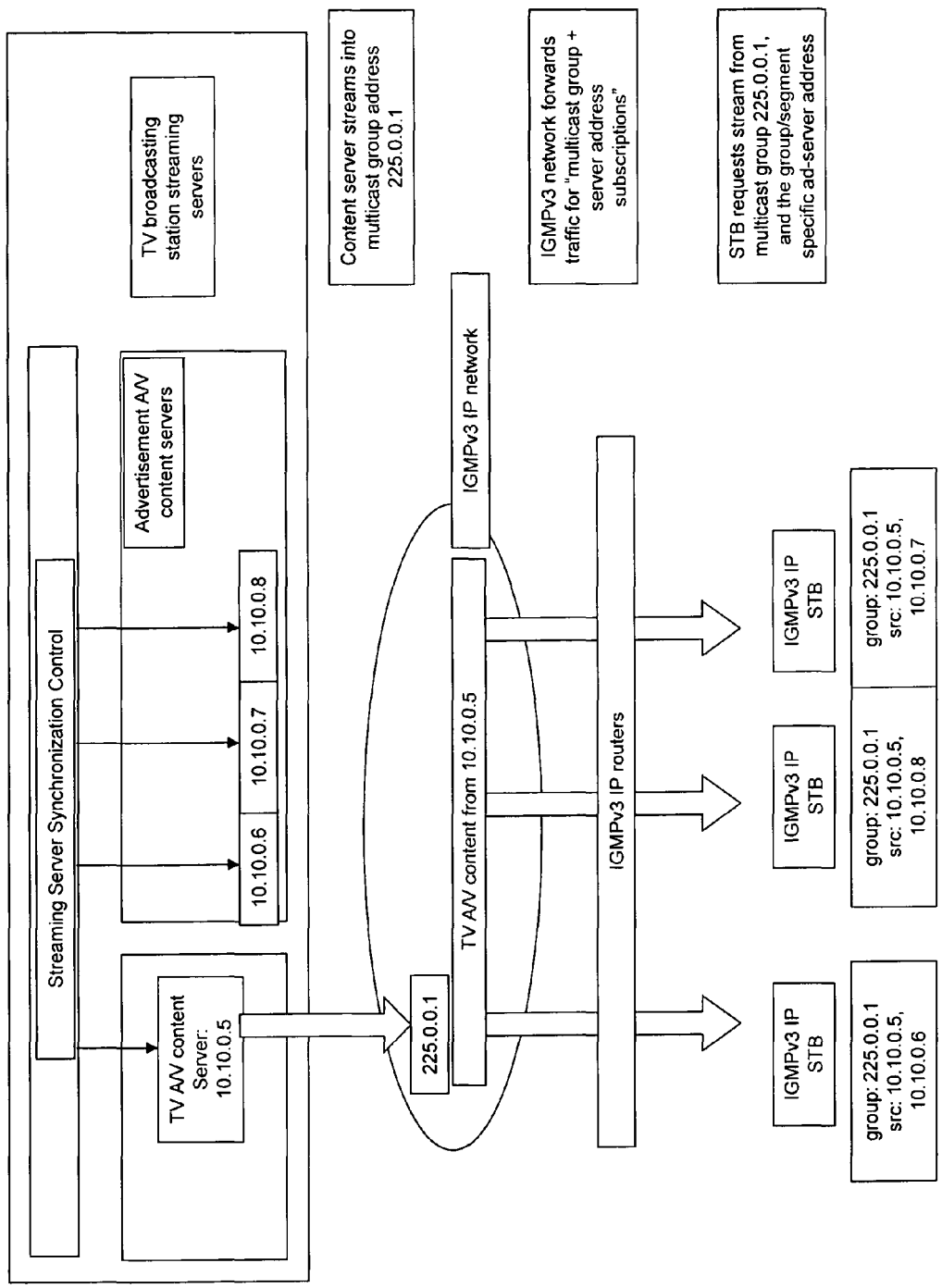
FIG. 1 is illustrating a normal IPTV channel broadcasting.

An embodiment of the invention allows large numbers of users to receive targeted TV advertisements during advertisement breaks on the same broadcast TV channel without requiring IP unicast AV content transmission. This increases the effectiveness of advertising and at the same time keeps the bandwidth consumption on the operator's IP network at an acceptable rate by utilizing IP multicasting.

The IPTV set of the user receives connectivity information depending on the advertising segment which the end user is assigned to. An important feature of this invention is, that the connectivity information can consist of a set of IP multicast group and source addresses, from which the IPTV set will expect to receive IP traffic containing TV content. In Source Specific Multicast (SSM), the IPTV set receives a multicast group IP address for the desired IPTV channel, a source IP address for the main content streaming server and a source IP address for the segment advertisement streaming server. During an advertisement break, the main content streaming server and the segment advertisement streaming servers take turn in a synchronized manner, so that only one IPTV AV stream is received at the IPTV set at a given point in time. IGMPv3 and MLDv2 are two multicast protocols supporting SSM.

Within the preferred embodiments standard SSM mechanisms can be used to let IPTV sets receive segmented advertising while saving broadcast IPTV network resources. Using SSM is compliant/transparent to ETSI TISPAN IMS based IPTV. The network side—a server for addresses, for example—can decide how the users are assigned to segments, i.e. business logic for this decision is shielded from hacked IPTV sets.

Personalized EPGs or SIP signaling (the former can be used in all IPTV approaches, the latter in the case of IMS based IPTV) can be used to carry the segment relevant information per TV channel.

Although an SSM enabled core network is beneficial, the proposed concept also can be realized using Any Source Multicast (ASM). This is the case for example in an IGMPv2 only network, by adding a small amount of additional logic to the IPTV set IP packet receiver and associating advertising Multicast Groups with the groups of IPTV channels (instead of introducing advertising specific Source Addresses). The client needs then to join the advertising group and the associated channel at the same time.

Within the preferred embodiments all streaming servers of an IPTV channel are synchronized. In other words, advertisement servers stream only in advertisement breaks while the content server must not stream during advertisement breaks and vice versa.

Within a preferred embodiment an EPG server provides IPTV channel connection details to the receiving IPTV set. The channel connection details or connectivity information could consist of a multicast group IP address of broadcast IPTV channel and—if no SSM is used—an advertising multicast group IP address for advertising group corresponding to the user's segment classification and the IPTV channel.

If SSM is used the connectivity information is comprising a multicast group IP address of broadcast IPTV channel, the main content server IP source address for broadcast IPTV channel and the IP source address of the advertisement server corresponding to the user's segment classification.

If ASM is used, the IPTV set joins the multicast groups of the requested IPTV channel and the associated advertising group using ASM join messages. This implies that the IPTV may receive data packets from two ASM groups.

If SSM is used, the IPTV set joins the multicast group of the requested IPTV channel using an SSM join, specifying the main content server and the segment advertisement server as multicast IP traffic sources.

Instead of the use of an EPG server the above information may be carried in the session setup signaling—e.g. in SIP signaling in case of IMS based IPTV—. Also preconfiguration/manual configuration of the channel information—e.g. through overnight download of the channel/advertising data—is possible.

In SSM scenarios source addresses can be used for identifying advertising segments. Further, streaming servers can take turns in a synchronized manner.

The use of SSM is not necessary, as the proposed method is also applicable to non-SSM enabled IP networks, e.g. IGMPv2.

For further saving bandwidth on the IPTV network the advertisement content servers can be located near receiving IPTV sets, if the respective advertisement content is requested only by such receiving IPTV sets.

The proposed method is completely transparent to receiving IPTV set in case of SSM. It can also be applied transparently to ETSI TISPAN IPTV standards. The invention enables fine grained segmented advertising in a broadcast IPTV channel. A user segment classification and assignment is possible in the network, i.e. the business logic for this assignment is shielded/protected from hacked IPTV sets. Further, the invention allows also to use ASM, but this is not transparent to the IPTV set, as it needs to join two multicast groups—advertising and channel itself—at the same time.

Other approaches according to the state of the art rely either on in stream signaling that is either parsed/understood by the receiving IPTV set or by so called splicers which insert advertisements into the IPTV stream at splicing points. While the splicer approach can also be applied to e.g. ETSI IPTV standards, the former approach cannot be applied easily. Clearly, the splicers need to have knowledge about the user segments to be able to stream appropriate advertisements. In this invention a personalized EPG (a common feature) or the session setup can easily be used to distribute the assignment of users to segments during the initiation phase.

The present approach does not rely on splicers but on general purpose streaming servers which are logically coupled and synchronized. Besides this synchronization for which standard means can be used which are not part of this invention, here are reused standard IP mechanisms resulting in cheaper equipment. Similar to the splicer approach the present invention can also be applied to ETSI IPTV standards.

FIG. 1 is illustrating the situation of an IPTV channel transmission of a TV main content. There are shown TV broadcasting station streaming servers, one TV A/V content server and three advertisement A/V content servers. A streaming server synchronization control is providing the synchronization of all streaming servers. The synchronization will effect that only the TV A/V content server or the advertisement A/V content servers will be received at a given point in time or a given time period.

FIG. 1 is illustrating the situation, when the TV A/V content server is received by the end users.

Figure 2:
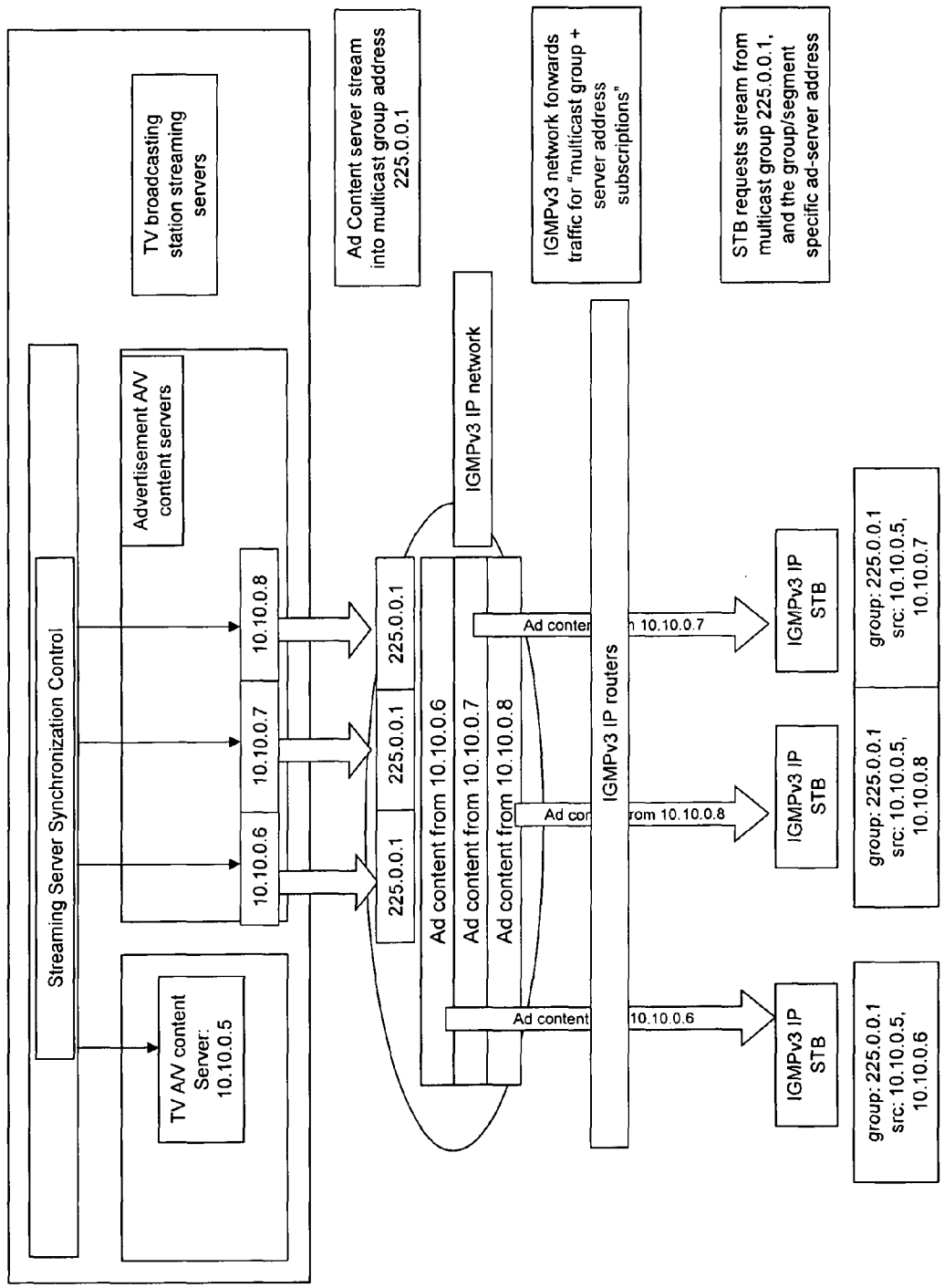
FIG. 2 is illustrating an IPTV channel broadcasting during an advertisement break.

FIG. 2 is illustrating the situation, when the advertisement A/V content servers are received during an advertisement break.

In both above situations the content servers stream into multicast group address 225.0.0.1. An IGMPv3 network forwards traffic for "multicast group+server address subscriptions". The transmission is realized via IGMPv3 IP routers to IGMPv3 IP STBs (Set Top Box). A Set Top Box (STB) requests stream from multicast group 225.0.0.1 and the group/segment specific advertisement server address (ad-server address).

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for distributing TV content over an IP network, the TV content comprising a main content and an advertisement content, comprising:
    transmitting a multicast address, on which a TV channel for the main content is distributed within the network, to an user as a connectivity information; and
    transmitting further connectivity information to the user, the further connectivity information depending on at least one advertising segment of the advertisement content which the user is requesting or to which the user is assigned, the further connectivity information comprising a further multicast address on which the advertising segment is distributed, or a source address for the main content and a source address for the advertising segment,
    wherein at least one of the connectivity information and further connectivity information is carried in a session setup signalling, and
    at least one of the connectivity information and further connectivity information is carried in SIP (Session Initiating Protocol) signaling in case of IMS (IP Multimedia Subsystem) based IPTV.

2. The method according to claim 1, wherein all streaming servers which are distributing the main content and the advertisement content are synchronized, so that only the main content or the advertisement content is received at the user at a given point in time or time period.

3. The method according to claim 2, wherein the given point in time or time period is an advertisement break.

4. The method according to claim 1, wherein at least one of the connectivity information and further connectivity information is provided by an EPG server.

5. The method according to claim 1, wherein at least one of the connectivity information and further connectivity information is provided by preconfiguration or manual configuration.

6. The method according to claim 5, wherein the preconfiguration is provided by overnight download of the connectivity information and further connectivity information.

7. A system for distributing TV content over an IP network, for carrying out the method according to claim 1, wherein the TV content comprises a main content and an advertisement content and wherein a multicast address on which a TV channel for the main content is distributed within the network is transmitted to an user as a connectivity information, comprising:
    means for transmitting further connectivity information to the user, the further connectivity information depending on at least one advertising segment of the advertisement content which the user is requesting or to which the user is assigned,
    wherein the further connectivity information comprises a further multicast address on which the advertising segment is distributed, or a source address for the main content and a source address for the advertising segment,
    at least one of the connectivity information and further connectivity information is carried in a session setup signalling, and
    at least one of the connectivity information and further connectivity information is carried in SIP (Session Initiating Protocol) signaling in case of IMS (IP Multimedia Subsystem) based IPTV.

8. The system according to claim 7, wherein all streaming servers which are distributing the main content and the advertisement content are synchronized, so that only the main content or the advertisement content is received at the user at a given point in time or time period.

9. The system according to claim 8, wherein the given point in time or time period is an advertisement break.

10. The system according to claim 7, wherein at least one of the connectivity information and further connectivity information is provided by an EPG server.

11. The system according to claim 7, wherein at least one of the connectivity information and further connectivity information is provided by preconfiguration or manual configuration.

12. The system according to claim 11, wherein the preconfiguration is provided by overnight download of the connectivity information and further connectivity information.

* * * * *